United States Patent [19]

Whitebay et al.

[11] Patent Number: 5,080,170

[45] Date of Patent: Jan. 14, 1992

[54] METHOD FOR REDUCING FLUID LEAK-OFF DURING WELL TREATMENT

[75] Inventors: Lee E. Whitebay; Lisa A. Cantu, both of Ponca City, Okla.

[73] Assignee: Conoco Inc., Ponca City, Okla.

[21] Appl. No.: 592,096

[22] Filed: Oct. 3, 1990

[51] Int. Cl.$^5$ .............................................. E21B 43/26
[52] U.S. Cl. .................................... 166/281; 166/300; 166/308; 252/8.551
[58] Field of Search ............... 166/271, 281, 283, 300, 166/308; 252/8.551

[56] References Cited

U.S. PATENT DOCUMENTS

| | | | |
|---|---|---|---|
| 4,549,608 | 10/1985 | Stowe et al. | 166/281 X |
| 4,660,640 | 4/1987 | Hoskin et al. | 166/270 |
| 4,735,265 | 4/1988 | Hoskin et al. | 166/270 X |
| 4,785,883 | 11/1988 | Hoskin et al. | 166/270 |
| 4,842,073 | 6/1989 | Himes et al. | 166/308 X |

FOREIGN PATENT DOCUMENTS 0333458  3/1989  European Pat. Off. .

Primary Examiner—George A. Suchfield
Attorney, Agent, or Firm—Richard W. Collins

[57] ABSTRACT

Low permeability formations are hydraulically fractured with a fracturing fluid which includes a material capable of (1) bonding fine formation particles to prevent movement of the particles into and within the formation and (2) forming a permeability-reducing skin at the formation/fluid interface to reduce fluid leak-off into the formation. The stabilizing and fluid leak-off reducing material is comprised of a water soluble polymer and an alkaline potassium salt.

3 Claims, No Drawings

METHOD FOR REDUCING FLUID LEAK-OFF DURING WELL TREATMENT

BACKGROUND AND SUMMARY OF THE INVENTION

1. Field of the Invention

This invention relates to well treatment operations, and more specifically to subterranean formation fracturing operations. The invention is particularly useful in fracturing operations carried out on low permeability gas formations where the formations are partly comprised of fine grain particles such as silt, clay, silicate, or a combination thereof. In fracturing such formations, stabilization of fine particles is important to minimize formation permeability reduction. It is also important to minimize the amount of fluid leaking off to the formation during the fracturing operation, thus reducing the amount of relative permeability blockage and decreasing the time required to pump back the lost fluids before the desired hydrocarbon fluids can be produced. An additional benefit of the process of the invention is that a reduced amount of conventional lost circulation material is needed.

2. The Prior Art

U.S. Pat. Nos. 4,660,640; 4,735,265 and 4,785,883 to Hoskin et al. describe a method of controlling permeability by injecting the reaction product of an alkali metal silicate and an organic hydroxy compound such as polyvinyl alcohol. These references do not suggest using the compositions to stabilize fine silt particles in a formation fracturing operation.

European Patent Application 89302558.5 describes shale-stabilizing drilling fluid additives which are similar in many respects to the materials useful in carrying out the process of this invention. The reference does not suggest using the materials to stabilize a formation to be fractured, or to reduce fluid leak-off from a fracturing fluid.

Lost circulation prevention materials are commonly used in fracturing operations.

SUMMARY OF THE INVENTION

According to the present invention, low permeability gas formations which include substantial amounts of fine silt, clay and/or silicate particles are fractured with a fracturing fluid which, in addition to comprising viscosifiers, solid proppant particles and conventional lost circulation prevention material, includes a stabilizing material capable of stabilizing the fine particles by bonding the particles, thereby preventing movement of the particles into and within the formation where such movement could result in reduction of the permeability of the formation. The stabilizing material also forms a thin permeability-reducing skin at the formation/fluid interface, reducing the amount of fracturing fluid leak-off into the formation. This results in a more effective fracturing job with a reduced amount of lost circulation material.

It is accordingly an object of the invention to provide an improved fracturing method for fracturing low permeability formations.

It is a further object to provide a fracturing fluid capable of stabilizing fine formation particles and of forming a permeability-reducing film at the formation/fluid interface during a fracturing operation.

The above as well as additional objects and advantages are obtained by carrying out the method of the invention as defined in detail below.

DESCRIPTION OF THE PREFERRED EMBODIMENTS

In a preferred embodiment of the invention, a low permeability gas formation (less than one millidarcy natural permeability) is hydraulically fractured using a fracturing fluid which, in addition to conventional fracturing fluid ingredients, includes a material which stabilizes fine particles in the formation and also reduces fluid leak-off from the fracturing fluid.

The stabilizing and fluid leak-off reducing materials useful in the present invention consist essentially of one or more water-soluble polymers combined with one or more alkaline potassium salts in wide-ranging ratios effective to give a composition having a pH of at least 9. The water-soluble polymer or polymers of this invention are of relatively high molecular weight and are capable of forming nucleophilic sites when treated with a base. The potassium salt or salts are those whose anions are relatively strong Bronsted-Lowry bases; i.e., give a pH of 9 or above in the presence of an aqueous solution of the polymer, but are relatively weak nucleophiles compared to the polymeric nucleophilic sites.

The weight ratio of polymer:potassium salt should generally be in the range between about 1:20 and about 3:1. A generally preferred ratio is one in the range between about 1:2 and about 2:1. The polymer/potassium salt material should be used in the fracturing fluid in a concentration sufficient to stabilize fine particles in the formation and to substantially reduce fluid leak-off to the formation. The upper limit on the polymer/salt content of the fracturing fluid is one of practicality. Usually the polymer/salt composition is added to the fracturing fluid at a level between about 0.01 weight percent and 10.0 weight percent (based on the weight of the aqueous phase), typically between about 0.1 and about 4.0 weight percent, and preferably between about 0.3 and about 2.0 weight percent.

The polymers useful for the purposes of this invention must be:

a. water-soluble,
b. capable of forming several nucleophilic sites within the same molecule when treated with bases, and
c. of relatively high molecular weight.

The polymers useful in this invention must not only be water-soluble but they should also have good wetting properties and a reasonable rate of dissolution in water for convenient use in the field. They should also afford aqueous solutions of low to moderate viscosities. The polymers useful in this invention must be polyfunctional and be capable of forming relatively strong nucleophilic sites when treated with bases, particularly in comparison with the potassium salts used in the fluids.

The polymers useful in this invention must have a relatively high molecular weight. While the exact molecular weights will vary from polymer to polymer, it is a parameter that can be determined empirically. Hydrolyzed vinyl acetate homopolymers having number average molecular weights ($M_n$) of about 46,000 or below, represented by ELVANOL 90-50 and ELVANOL 71-30, while giving some skin-forming effect, are substantially less effective than those of higher molecular weight. ELVANOL HV hydrolyzed vinyl acetate homopolymer, $M_n$ of about 75,000, used as is or cross-linked with glutaraldehyde to increase the $M_n$ to about 190,000, is more effective. The ELVANOL products referred to herein are available from E. I. du Pont de Nemours and Company.

The polymers of choice for purposes of the invention are partially hydrolyzed polymeric vinyl acetate (PHPVA) homo- and copolymers. In general, the homopolymers should be at least 75 mol percent hydrolyzed to the corresponding polyvinyl alcohols and have an $M_n$ of 50,000 or more. In practice, the vinyl acetate homopolymer can be hydrolyzed to about 98 to 99 percent. However, as that upper practical limit is approached, the polymer becomes more crystalline and, as a consequence, less soluble in water, requiring heat to dissolve it. PHPVA which is about 87 or higher mol percent hydrolyzed is the most soluble in water. The only constraint on molecular weight is water-solubility. In a preferred embodiment, a vinyl acetate homopolymer which has been hydrolyzed about 87 percent is used.

In another preferred embodiment, a vinyl acetate copolymer is used. In the latter embodiment, the vinyl acetate portion of the copolymer can be hydrolyzed as fully as possible (about 98 to 99 percent) without loss of water-solubility. The presence of copolymer units derived from monomers other than vinyl acetate inhibits crystallization and thereby promotes water-solubility. Representative comonomers include acrylic and methacrylic acids, amides such as acrylamide and methacrylamide, and alkyl methacrylonitrile and acrylonitrile. The amount of the comonomer used with vinyl acetate will vary with the identity of the comonomer. However, that amount can be determined empirically by using enough to provide the degree of water-solubility desired in the co-polymer. For example, vinyl acetate copolymers can be prepared from the preferred comonomer, acrylic acid, using monomer mixtures containing 14 to 39 mol percent (preferably 20 to 35 mol percent) acrylic acid.

Other polymers suitable for the purposes of this invention include partially (about 30 percent) hydrolyzed polyacrylamide which also contains potassium chloride; carboxymethyl hydroxyethyl celluloses having an $M_n$ of between 350,000 and 500,000; hydroxyethyl celluloses having an $M_n$ of about 200,000; hydroxypropyl methyl celluloses having an $M_n$ of from about 300,000 to 1,000,000; and hydroxy-propyl guar having an $M_n$ of about 600,000.

One or more potassium salts are used with the polymers in the process of this invention. The anions of the potassium salts must be relatively strong Bronsted-Lowry bases, but they should be relatively weak nucleophiles in comparison with the nucleophilic sites on the polymers. The potassium salts should be sufficiently alkaline so as to raise the pH to about 9.0 and to buffer it, at least temporarily, at a pH of at least 9.0. A pH range of 9.0 to 13.0 is suitable, with a pH range of 10.5 to 11.5 being preferred. It is technically feasible to operate at pH values between 11.5 and 13.0. However, such high pH values are somewhat less acceptable with respect to exposure of personnel in the field. A number of inorganic salts are suitable for use in conjunction with the polymers. Potassium silicate, potassium carbonate, and tribasic potassium phosphate may be used. The anions of these salts are all fairly strong Bronsted-Lowry bases and fairly weak nucleophiles.

Potassium silicates can be obtained commercially in a variety of $SiO_2$ to $K_2O$ ratios. Those having a $SiO_2/K_2O$ ratio in the range of about 0.5 to 2.5 are suitable for use in the present invention. However, the range of about 1.5 and 2.2 is preferred. When potassium silicates in the preferred range are included, the resultant fluids are very effective. Moreover, these types of potassium silicates are not expensive and do not tend to absorb moisture during storage or handling.

Water-soluble, partially hydrolyzed polyvinyl acetate (PHPVA) combined with potassium silicate, with or without another alkaline potassium salt, is used in a preferred embodiment of the present invention. In general, a composition within that embodiment will contain by weight about 20 to 100 parts of PHPVA, about 25 to 90 parts of potassium silicate, and 0 to about 90 parts of another alkaline potassium salt, such as potassium carbonate. A more preferred composition will contain about 40 to 70 parts of PHPVA, about 20 to 50 parts of potassium silicate, and about 10 to 40 parts of potassium carbonate. A most preferred composition is 70 parts PHPVA, 20 parts potassium silicate, and 10 parts potassium carbonate.

The ingredients that make up the compositions useful in this invention may be introduced into the fracturing fluid in a variety of ways. For example, they may be combined by simple blending to form an additive mixture, commonly referred to as a premix, for later incorporation into the fluid, or each ingredient may be added separately as the fluid is being prepared, with order of addition being discretionary.

The fracturing process of this invention can be applied to all types of formations, but it is particularly applicable in low permeability (less than one millidarcy) or tight (less than 0.1 millidarcy) gas formations where the formation contains a substantial amount of fine clay, silt and/or silicate particles. The invention provides a stabilizing effect on the fine particles by bonding them in place, preventing permeability-reducing movement of the fine particles. The invention also reduces fluid leak-off from the fracturing fluid, with benefits of allowing use of reduced amounts of lost circulation material as well as decreasing the time needed to recover treatment fluids before production is resumed. A particular benefit from carrying out the process on low permeability formations is that the reduced fluid leak-off minimizes the relative permeability damage that can occur when aqueous fluids penetrate the formation. When low permeability or tight formations become water saturated, it is difficult to recover oil or gas permeability from the formation.

The process of a preferred embodiment of the invention is described in the following Example, which is intended to be illustrative rather than limiting.

EXAMPLE I

A cased and cemented wellbore penetrating a potentially gas-producing formation having a permeability of less than one millidary and containing a substantial amount of fine silty particles is perforated to establish fluid communication between the wellbore and the formation. The wellbore is then hydraulically fractured with a fracturing fluid containing 1.0 percent by weight of a polymer/salt composition comprising 70 percent by weight partially hydrolyzed polyvinyl acetate, 20 percent by weight potassium silicate, and 10 percent by weight potassium carbonate. The polymer/salt composition stabilizes the fine silty particles, reducing formation permeability damage, and also reduces fluid leak-off into the formation. Solid proppant materials in at least a portion of the fracturing fluid are carried into the fractures and serve to maintain increased permeability in the fractured area. The well is then shut in for a period to allow the formation to stabilize, and then the well is placed on production.

We claim:

1. In a process for fracturing a potentially gas-producing subterranean formation which has a natural permeability of less than 1 millidarcy and which contains fine-grained particles selected from the group consisting of clay, slit, and silicates, said formation being penetrated by a wellbore, wherein hydraulic pressure is imposed on said formation by a fracturing fluid, the improvement wherein said fracturing fluid includes a polymer/salt composition consisting essentially of one or more water-soluble high molecular weight polyfunctional polymers capable of forming several nucleophilic sites when treated with base, and one or more potassium salts whose anions are Bronsted-Lowry bases of sufficient strength to raise the pH of the resultant fracturing fluid to about 9.0 but which are relatively weak nucleophiles compared to the polymeric nucleophilic sites, said polymer/salt composition being present in an amount sufficient to stabilize said fine-grained particles in place and to reduce the leak-off said fracturing fluid into said formation during said fracturing process.

2. The process of claim 1 wherein said polymer/salt composition comprises 70 percent by weight partially hydrolyzed polyvinyl acetate, 20 percent by weight potassium silicate, and 10 percent by weight potassium carbonate.

3. The process of claim 1 wherein said polymer/salt composition is present in said fracturing fluid in a concentration between 0.3 and 2.0 percent by weight.

* * * * *